US008792626B2

(12) United States Patent
Cook et al.

(10) Patent No.: US 8,792,626 B2
(45) **Date of Patent: *Jul. 29, 2014**

(54) TRANSMISSION OF UTILITY DATA

(75) Inventors: Charles I. Cook, Louisville, CO (US); Ronnie S. Dhaliwal, Centennial, CO (US); Steven M. Casey, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 784 days.

This patent is subject to a terminal disclaimer.

(21) Appl. No.: 12/491,117

(22) Filed: Jun. 24, 2009

(65) Prior Publication Data

US 2009/0322556 A1 Dec. 31, 2009

Related U.S. Application Data

(63) Continuation-in-part of application No. 12/409,975, filed on Mar. 24, 2009, which is a continuation of application No. 10/377,280, filed on Feb. 27, 2003, now Pat. No. 7,921,443, which is a continuation-in-part of application No. 10/356,364, filed on Jan. 31, 2003, now Pat. No. 7,180,988, and a continuation-in-part of application No. 10/356,688, filed on Jan. 31, 2003, now Pat. No. 7,454,006, and a continuation-in-part of application No. 10/356,338, filed on Jan. 31, 2003, now Pat. No. 8,537,814, and a continuation-in-part of application No. 10/367,596, filed on Feb. 14, 2003, now abandoned, and a continuation-in-part of application No. 10/367,597, filed on Feb. 14, 2003, now Pat. No. 7,433,465.

(51) Int. Cl.
*H04M 11/00* (2006.01)

(52) U.S. Cl.
USPC .................................. 379/90.01; 340/870.02

(58) Field of Classification Search
USPC ............ 340/870.11, 870.03, 538.15, 538.16, 340/538.11, 310.16; 705/63, 412; 379/106.03
See application file for complete search history.

(56) References Cited

U.S. PATENT DOCUMENTS 5,451,938 A * 9/1995 Brennan, Jr. ............. 340/870.14
5,602,744 A 2/1997 Meek et al.
5,706,191 A * 1/1998 Bassett et al. ..................... 700/9

(Continued)

OTHER PUBLICATIONS

U.S. Appl. No. 12/409,975; Final Office Action dated Oct. 18, 2011; 10 pages.

(Continued)

*Primary Examiner* — Maria El-Zoobi
(74) *Attorney, Agent, or Firm* — Swanson & Bratschun, L.L.C.

(57) ABSTRACT

Certain embodiments are directed at methods and systems for transmitting utility usage data using a public switched telephone network ("PSTN"). The methods and systems may include collecting utility usage data pertaining to a customer premises with a utility meter at the customer premises. The utility usage data may be transmitted automatically from the utility meter to an access point of a public broadband network. The utility usage data may be received at the access point. A digital subscriber line ("DSL") modem in communication with the access point may modulate the utility usage data at the access point. The utility usage data may be transmitted securely through the public switched telephone network to an Internet point of presence. The utility usage data may be received at the Internet point of presence. The utility usage data may be transmitted from the Internet point of presence to a utility provider via the Internet.

29 Claims, 10 Drawing Sheets

(56) References Cited

U.S. PATENT DOCUMENTS 6,230,194 B1 * 5/2001 Frailong et al. ............... 709/220
6,349,133 B1 * 2/2002 Matthews et al. .......... 379/90.01
6,735,630 B1 5/2004 Gelvin et al.
6,819,098 B2 * 11/2004 Villicana et al. ......... 340/870.02
2002/0004898 A1 * 1/2002 Droge ........................... 713/151
2004/0004555 A1 * 1/2004 Martin ..................... 340/870.02
2005/0162283 A1 * 7/2005 Salazar Cardozo ...... 340/870.11
2009/0102680 A1 * 4/2009 Roos ........................ 340/870.02
2012/0188072 A1 * 7/2012 Dawes et al. ................. 340/514
2012/0331109 A1 * 12/2012 Baum et al. .................. 709/219

OTHER PUBLICATIONS

U.S. Appl. No. 11/399,097, Office Action dated Apr. 15, 2011, 43 pages.

U.S. Appl. No. 12/409,975; Non-Final Rejection dated Jan. 17, 2013; 16 pages.

U.S. Appl. No. 12/409,975; Final Rejection dated May 6, 2013; 15 pages.

* cited by examiner

TRANSMISSION OF UTILITY DATA

CROSS-REFERENCES TO RELATED APPLICATIONS

This application is a continuation-in-part of co-pending U.S. patent application Ser. No. 12/409,975, filed Mar. 24, 2009 by Casey et al. and entitled "Transmitting Utility Usage Data Via A Network Interface Device" (referred to herein as the "Casey Application"). The Casey application is a continuation of U.S. patent application Ser. No. 10/377,280, filed Feb. 27, 2003 by Phillips et al. and entitled "ADSL/DBS NETWORK INTERFACE DEVICE AND METHODS AND SYSTEMS FOR USING THE SAME (the "'280 application"). The '280 application is a continuation-in-part application of U.S. patent application Ser. No. 10/356,364, entitled "PACKET NETWORK INTERFACE DEVICE AND SYSTEMS AND METHODS FOR ITS USE," filed Jan. 31, 2003 by Bruce A. Phillips et al.; is a continuation-in-part application of U.S. patent application Ser. No. 10/356,688, entitled "SYSTEMS, METHODS AND APPARATUS FOR PROVIDING A PLURALITY OF TELECOMMUNICATION SERVICES," filed Jan. 31, 2003 by Bruce A. Phillips et al.; is a continuation-in-part application of U.S. patent application Ser. No. 10/356,338, entitled "CONFIGURABLE NETWORK INTERFACE DEVICE AND SYSTEMS AND METHODS FOR ITS USE," filed Jan. 31, 2003 by Bruce A. Phillips et al.; is a continuation-in-part of U.S. patent application Ser. No. 10/367,596, entitled "SYSTEMS AND METHODS FOR DELIVERING A DATA STREAM TO A VIDEO APPLIANCE," filed Feb. 14, 2003 by Steven M. Casey et al.; and is a continuation-in-part of U.S. patent application Ser. No. 10/367,597 entitled "SYSTEMS AND METHODS FOR PROVIDING APPLICATION SERVICES," filed Feb. 14, 2003 by Steven M. Casey et al. The entire disclosure of each of the above-referenced applications is herein incorporated by reference for all purposes, and these applications are collectively referred to herein as the "Incorporated Applications."

BACKGROUND

This invention relates generally to methods and systems for transmitting utility data to a utility provider. More specifically the invention relates methods and systems for transmitting utility data using a broadband modem and a service provider's access network.

Traditional utility meter reading has involved a utility company sending a technician out to a customer premises to visually read the utility meter. Radio frequency technology has made the process somewhat easier by allowing a technician to drive through a neighborhood with a radio receiver and gather utility meter readings that are transmitted over a radio frequency from the utility meter to the technician's receiver. Both of these techniques require substantial human interaction, resulting in increased cost and decreased convenience. Moreover, neither of these methods is amenable to real-time meter reading.

At the same time, technologies have developed to allow utility customers to monitor and manage different devices and appliances within their homes. However, these technologies currently are limited to individual users implementing their own Home Automated Networks using private Home Networking mechanisms such as X10, Z-Wave, and Zigbee. To date, however, such technologies have been implemented on an individual scale and cannot benefit from centralized monitoring and/or management capabilities; further, because there is no interface between such technologies and current information about utility rates, the potential benefits of such technologies have not been maximized.

There is thus a need for tools and techniques that allow utility providers to collect meter readings without a technician having to visit a customer premises. It would be advantageous, in some situations, for such tools and techniques to provide centralized monitoring, managing, and controlling of device usage in the home.

BRIEF SUMMARY

Certain embodiments thus provide tools and techniques allowing utility providers to collect meter readings without a technician having to visit a customer premises, along with providing centralized monitoring, managing, and control of device usage in a home. Data pertaining to a meter reading may be transmitted from a utility meter to an access point of a public broadband network, in some cases without any human intervention. The access point may include a modem, such as a digital subscriber line ("DSL") modem (to name but one example), which may modulate the data pertaining to the meter reading. The modulated data may then be transmitted securely through a public switched telephone network ("PSTN") to the Internet. The data may then be received by the utility provider via the Internet.

Some embodiments may take advantage of existing equipment, networks, infrastructures, and devices. Merely by way of example, some embodiments may utilize an existing or easily installed access point, such as a DSL modem at a customer premises. In addition, some embodiments may utilize an existing public network, including without limitation a broadband network and/or a public switched telephone network, rather than requiring the deployment of additional communication mediums. Embodiments may also utilize wireless technology that presently allow technicians to capture meter reading data with a handheld device. This existing wireless technology may provide a communication link for data to be transmitted through a service provider's access network to a utility provider without human intervention.

Certain embodiments are directed to methods and systems for transmitting utility usage data using a public switched telephone network. The methods and systems may include collecting utility usage data pertaining to a customer premises with a utility meter at the customer premises. The utility usage data may be transmitted automatically from the utility meter to an access point of a public broadband network. The utility usage data may be received at the access point. A digital subscriber line modem in communication with the access point may modulate the utility usage data at the access point. The utility usage data may be transmitted securely through the public switched telephone network to an Internet point of presence. The utility usage data may be received at the Internet point of presence. The utility usage data may be transmitted from the Internet point of presence to a utility provider via the Internet. In some cases, a virtual private network may be used to transmit the utility usage data; in other cases, a private line may be used to transmit the utility usage data, e.g., from a local office of a telecommunication provider to the utility provider.

Embodiments may include methods and systems for transmitting utility usage data using a service provider's access network. Methods and systems may include collecting utility usage data with a data collecting device. The utility usage data may be transmitted from the data collecting device to an access point coupled with a modem. The utility usage data may be received at the access point. The utility usage day may be transmitted from the access point to a receiving entity through the service provider's access network.

In another embodiment, a system may transmit utility usage data using a public switched telephone network. The system may include a power line communications network at a customer premises. A utility meter may be in communication with a power line communications network. The utility meter may collect utility usage data from the customer premises. A transmission device may be in communication with the utility meter. The transmission device may be configured to transmit automatically and securely utility usage data from the utility meter. An access device may be in communication with the transmission device to receive the secure utility usage data. A digital subscriber line modem may be in communication with the access device. The DSL modem may be configured to securely transmit the utility usage data through a public switched telephone network to a utility provider via the Internet.

In yet another embodiment, a system for transmitting utility usage data over a service provider's access network is provided. The system may include a utility usage data collecting device. The system may also include a broadband modem in communication with the utility usage data collecting device. The broadband modem may be configured to communicate with the service provider's access network and/or to transmit utility usage data from the utility usage data collecting device to a receiving entity.

BRIEF DESCRIPTION OF THE DRAWINGS

The present invention is described in conjunction with the appended figures.

Figure 1:
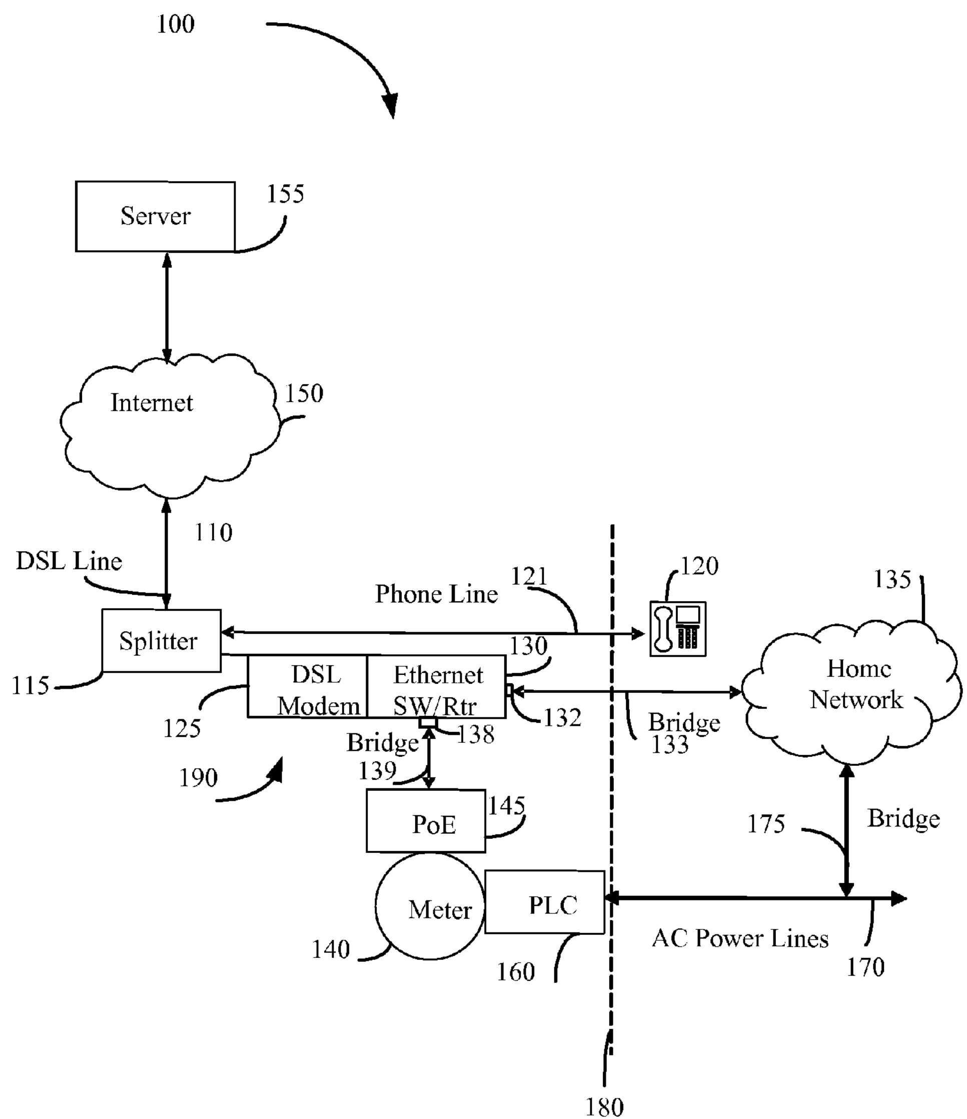
FIG. 1 illustrates a system for transmitting utility usage data using a service provider's access network with a modem exterior to a demarcation boundary, in accordance with various embodiments.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF EXEMPLARY EMBODIMENTS

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments, it being understood that various changes may be made in the function and arrangement of elements without departing from the spirit and scope of the invention as set forth in the appended claims. Several embodiments are described herein, and while various features are ascribed to different embodiments, it should be appreciated that the features described with respect to one embodiment may be incorporated within other embodiments as well. By the same token, however, no single feature or features of any described embodiment should be considered essential to every embodiment of the invention, as other embodiments of the invention may omit such features.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process may be terminated when its operations are completed, but could also comprise additional operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Certain embodiments are directed to methods and systems for transmitting utility usage data using a public switched telephone network ("PSTN"). PSTN may include local loops or subscriber lines that may be physical links or circuits that connect from a demarcation point of a customer premises to a service provider's network. A local loop may be provisioned to support data communications applications. A local loop may be provisioned to support combined voice and data such as a digital subscriber line ("DSL"). The methods and systems may include collecting utility usage data pertaining to a customer premises with a utility meter at the customer premises. The utility usage data may be transmitted automatically from the utility meter to an access point of a public broadband network. The utility usage data may be received at the access point. A DSL modem in communication with the access point may modulate the utility usage data at the access point. The utility usage data may be transmitted securely through the public switched telephone network to an Internet point of presence. The utility usage data may be received at the Internet point of presence. The utility usage data may be transmitted from the Internet point of presence to a utility provider via the Internet, via a virtual private network ("VPN"), and/or via a private line, among other possibilities.

Embodiments may include methods and systems for transmitting utility usage data using a service provider's access network. Methods and systems may include collecting utility usage data with a data collecting device. The utility usage data may be transmitted from the data collecting device to an access point coupled with a modem. The utility usage data may be received at the access point. The utility usage data may be transmitted from the access point to a receiving entity through the service provider's access network.

A data collecting device may include a wide variety of devices, including without limitation a utility meter, such as an electricity meter, a gas meter, and/or a water meter. A utility meter may collect data regarding customer premises equipment ("CPE"). A utility meter may collect data regarding smart devices. Merely by way of example, smart devices may include any devices, outlets, appliances, and/or equipment that may be capable to sending or receiving information in order to facilitate monitoring, maintaining, and/or controlling the smart device. A data collecting device may include, but not limited to, such things as a set-top box or a network interface device. A data collecting device may include a computer, capable of gathering, storing, and/or transmitting data regarding utility usage. In some cases, a data collecting device may be a dedicated device for collecting utility usage data from a variety of devices within a particular premises; such a device may be (but need not necessarily be) incorporated within and/or in communication with a utility meter.

A data collecting device may be in communication with a power line communications ("PLC") network. A PLC network may include any system in which data is transmitted over power lines, which may include without limitation relatively high-voltage transmission lines, medium voltage distribution lines, and lower voltage lines used inside buildings. PLC may include, inter alia, systems referred to in the art as power line carrier, power line digital subscriber line, mains communication, power line telecom, and/or power line networking. PLC may be a system for carrying data on a conductor also used for electric power transmission. PLC may include impressing a modulated carrier signal on a wiring system to convey information along the wiring system. In some embodiments, a PLC network may provide Internet access to devices connected to the PLC network. A PLC network may also be used to query and send commands to smart devices, enabling them to be remotely monitored, controlled, and/or maintained by servers in a network. A user of the smart devices may also be able to monitor, control, and/or maintain different devices using a PLC network. A PLC network may also comprise and/or be bridged to a Home Network. This may effectively expand the Home Network to include data capabilities over the AC power lines in a customer premises.

A data collecting device may be attached to the exterior wall of a customer premises. In some embodiments, a data collecting device may be located within a customer premises or remotely from a customer premises. In some embodiments, a data collecting device may be coupled with an access point. Some embodiments that include a data collecting device coupled with an access point may receive utility usage data using a variety of technologies, including, but not limited, to Encoder Receiver Transmitter ("ERT") and/or other wireless technologies.

Utility usage data may include a wide variety of data, including without limitation electricity usage data, water usage data, gas usage data, and/or smart device utility usage data. Usage data can include, for example, information about a quantity of electricity, water, gas, etc. used, information about a rate of use, information about a time period of use, and/or the like. In a particular example, a set of utility usage data might specify that a customer premises had consumed a particular volume (or mass) of natural gas over a particular time period (such as 12:00 am to 6:00 am on a particular date). In some embodiments, utility usage data may be transmitted from a single customer premises to a remote terminal, while in other embodiments, utility usage data may be transmitted from multiple customer premises to a remote terminal.

Utility usage data may be transmitted from a data collecting device in many different ways, including without limitation being transmitted automatically without human input. Data may be transmitted on a regular schedule, such as every second, every minute, every hour, every day, and/or every month, or based on specific numerical increments of these time units. Data may be transmitted in real-time. Data may be transmitted based on other factors, such as when the utility usage changes and/or on demand. For example, when the utility usage goes up or goes down and/or when a specific device is used, data may be transmitted in some embodiments. Data may be transmitted when queried by another device, server, entity, and/or user. Data may be transmitted when the cost of utility usage changes. Merely by way of example, if the cost of electricity, gas, and/or water changes, the rate or timing of data transmission may change, which may allow a utility provider to charge more accurately a customer based on when and how they use a utility. Also, the rate or timing of data transmission may also be determined to help provide a user of the utility, such as a utility customer, more information so that they may be better able to monitor, maintain, and/or control their utility usage. Data may also be transmitted when the data collecting device receives a prompt sent by a receiving entity.

An access point may receive utility usage data from a data collecting device. The access point may include a modem, which may modulate the utility usage data so that it may be transmitted over different transport mediums and/or different communications networks and/or infrastructures. In some embodiments, an access point may be integrated into a modem. In some embodiments, an access point may be interfaced to communicate with the modem. A modem may be a broadband modem. In some embodiments, a modem may be a DSL modem. In some embodiments, a modem may be an optical network termination ("ONT") device. Devices such as a ONT and DSL modem may in general provide a means for connecting to a service provider's access network. These devices in general may be referred to as access network interface devices. An access point may be an access point of a pubic broadband network and/or a service provider's access network. A service provider's access network may include a DSL network in some embodiments. In some embodiments, a service provider's access network may include an optical network, which may include without limitation fiber to the premises ("FTTP") architectures, fiber to the curb ("FTTC") architectures, and fiber to the house ("FTTH") architectures.

An access point may include or be coupled with different devices and/or components. In some embodiments, an access point may include an Ethernet switch and/or a router. Switch/router may have one or more ports. One port may connect with a Home Network. It may do so using any number of Home Networking technologies such as, merely by way of example, Ethernet over CAT5 cabling, MoCA over Coax, HPNA over twisted-pair, PLC over AC wiring, G.hn (currently being standardized in the ITU). Another port may connect with a data collecting device. In some embodiments, a port of the access point may be configured to interface with different types of communication channel specifications. Merely by way of example, an access point may be configured to interface with RS 485, EIA-485, RS 422, and/or encoder-receiver-transmitter ("ERT"), which may be used with different data collecting devices and interface components coupled with a data collecting device in order to transmit data to a receiver.

An access point may include and/or be coupled with a wireless access component and/or point (for example, a "WiFi AP"). (Although the term "WiFi" is used herein for convenience, it should be appreciated that this term includes any appropriate wireless transmission technologies, including without limitation the IEEE 802.11 suite of protocols, as well as WiMax, Bluetooth, Wireless USB, CDMA- and/or GSM-based technologies, and/or the like.) Through a WiFi AP, an access point may receive utility usage data from a data collection device. An access point may also transmit data to data collection device through a WiFi AP. In other embodiments, an access point may be in communication with a data collection device through a physical transmission medium. In some embodiments, an access point may be in communication with a data collection device through an Ethernet and/or USB cable. In some embodiments, power may be transmitted to an access point to power the devices and/or components of the access device and/or coupled with the access device through Power over Ethernet ("PoE"). Some embodiments may include an access point that may receive power in numerous different ways including, but not limited to, line powering over a copper pair and/or power from a power take-off collar from a power meter.

An access point may be located exterior to a customer premises in some embodiments. An access point may be located within a customer premises. In some embodiments, an access point may communicate with numerous data collection devices associated with different customer premises.

In some embodiments, an access point may comprise and/or be incorporated with a network interface device ("NID"). The Incorporated Applications describe various NIDs in detail. Any of such NIDs can be implemented as an access point in accordance with various embodiments. Similarly, the various transport media described in connection with these NIDs may serve as the communication infrastructure implemented by various embodiments described herein.

Utility usage data may be transmitted from an access point to a receiving entity in different ways. Utility usage data may be transmitted through a service provider's access network. Utility usage data may be transmitted through a public switched telephone network. Utility usage data may be received at an Internet point of presence and then reach a receiving entity via the Internet.

Embodiments may include different receiving entities, including the following with a limitation. A receiving entity may include a utility provider. A receiving entity may include a service provider that may provide access to an access network. A receiving entity may be a utility services provider that provides services to utility providers and/or utility customers. A receiving entity may also include a customer and/or user of a utility. A receiving entity may include an aggregation provider. An aggregation provider may receive utility usage data from multiple sources. Merely by way of example, an aggregation provider may aggregate data from multiple sources through a network including, but not limited to, a broadband over power line and/or mesh network and provide the aggregated data to an access point. An aggregation provider may be an intermediate receiving entity that may receive utility usage data before another receiving entity receives the utility usage data.

Transmitting utility usage data from a data collecting device to an access point and then from an access point to a receiving entity may be done securely. In some embodiments, the utility usage data may be encrypted. In some embodiments, utility usage data may be securely transmitted using methods, networks, and or protocols such as SSL, VPN, HTTPS and/or other known methods for securely transmitting data over different communications channels. In some embodiments, utility usage data from a data collection device may include identification information that distinguishes it from other utility usage data from other data collection devices. This may allow different access points and/or receiving entities to know if different data collecting devices have been successfully communicated with, which data collecting data devices have not been communicated with, providing for alternative measures to be taken if necessary.

In some embodiments, methods may include bi-directional communication. Utility usage data, for example, may be transmitted to a receiving entity. Data may be transmitted from a receiving entity or other entity to a data collecting device. A data collecting device in communication with a PLC may send this received data to a device, appliance, or equipment also in communication with the PLC in order to control, monitor, and/or maintain the device, appliance, or equipment.

In some embodiments, a set of control data may be received at an access point from a service provider's access network. The control data may be transmitted from the access point to a data collecting device. The control data may be received at the data collecting device and then transmitted to at least one device in order to control, monitor, and/or maintain the device. (Alternatively, the access point may transmit such data directly to the device to be controlled, monitored and/or maintained.) In some embodiments, the control data received at the data collecting device may prompt the data collecting device to transmit utility usage data to a receiving entity. Merely by way of example, a data collecting device may need to be "woken up" before it will transmit data. Thus, in some embodiments, a receiving entity may transmit to a data collecting device a "wake up" signal, prompting the data collecting device to send data to the receiving entity, for example.

In another embodiment, a system may transmit utility usage data using a PSTN. The system may include a power line communications network at a customer premises. A utility meter may be in communication with a power line communications network. The utility meter may collect utility usage data from the customer premises. A transmission device may be in communication with the utility meter. The transmission device may be configured to transmit automatically and securely utility usage data from the utility meter. An access device may be in communication with the transmission device to receive the secure utility usage data. A DSL modem may be in communication with the access device. The DSL modem may be configured to securely transmit the utility usage data through a PSTN to a utility provider via the Internet.

In another embodiment, a system for transmitting utility usage data over a service provider's access network is provided. The system may include a utility usage data collecting device. The system may also include a broadband modem in communication with the utility usage data collecting device. The broadband modem may be configured to communicate with the service provider's access network and to transmit utility usage data from the utility usage data collecting device to a receiving entity.

The system for transmitting utility usage data over a service provider's access network may include a power line communications ("PLC") network in communication with the data collecting device in some embodiments. The PLC network may provide communication between devices, appliances, and/or other equipment at a customer premises and the utility usage data collecting device.

The system for transmitting utility usage data over a service provider's access network may include a network interface device ("NID"). The Incorporated Applications describe various NIDs in detail. As noted above, any of such NIDs can be implemented as a remote terminal in accordance with various embodiments. Similarly, the various transport media described in connection with these NIDs may serve as the communication infrastructure implemented by various embodiments described herein. A broadband modem may be housed within the NID device in some embodiments.

In some embodiments, the broadband modem may be configured to receive control instructions from the receiving entity. Control instructions may include instructions for controlling, monitoring, and/or maintaining devices at a customer premises. The broadband modem may be configured to transmit the control instructions to the utility usage data collecting device. The system may be configured to transmit the control instructions through a PLC network to a device, appliance, and/or equipment at a customer premises.

Turning now to FIG. 1, a system 100 for transmitting utility usage data and/or receiving utility control, monitoring, and maintenance data using a service provider's access network is shown. Digital subscriber line ("DSL") 110 may carry both low frequency analog voice and high frequency data. Splitter 115 may separate the spectrum so that low frequency voice information may go to telephone 120 via phone line 121, and the high frequency data information may go to DSL Modem 125. DSL modem 125 may demodulate the signal and presents it to Ethernet switch/router 130. DSL modem 125 and Ethernet switch/router 130 may be housed together, or separately while still being in communication with each other. These components that provide access to a network may be referred to as access point 190. Access point 190 may be exterior to a customer premises boundary 180. In some embodiments, an access point may have demarcation capabilities. The Incorporated Applications describe various demarcation capabilities in detail.

Switch/router 130 may have one or more ports. One port 132 may connect to a Home Network 135 (e.g., through a bridge 133). It may do so using any number of Home Networking technologies such as, merely by way of example, Ethernet over CAT5 cabling, MoCA over Coax, HPNA over twisted-pair, PLC over AC wiring, and/or G.hn (currently being standardized in the ITU). Another port 138 may connect to data collecting device 140 through another bridge 139. In some embodiments, data collecting device 140 may be a utility meter. A utility meter may include a meter for measuring electricity, water, and/or gas usage. In some embodiments, data collecting device 140 may gather data regarding the use of at least one smart device. Data collecting devices and the data they may gather is discussed in more detail above.

In some embodiments, access point 190 may include modem, such as DSL modem 125, that may be powered from a connection coupled with data collecting device 140 using a variety of technologies. In one embodiment shown in FIG. 1, Power over Ethernet ("POE") 145 may be used. POE may provide power over an Ethernet cable/USB cable to receiving devices such as the DSL modem 125, switch/router 130, and/or access point 190 in general. Data collecting device 140 may then interface to switch/router 130 and either transmit or receive data as appropriate. Utility usage data may be transmitted over DSL line 110 back to Internet cloud 150. Internet cloud 150 may route utility usage data to server 155 that collects the utility usage data and performs appropriate management activities. Server 155 may belong to a utility provider or it may be a server associated with a service provider's access network. In some embodiments, utility usage data may be routed to a user of the utility. Various servers may perform or enable a variety of services that may or may not be based on the utility usage data indicated by data collecting device 140.

Access point 190 may be coupled with data collecting device 140 and Home Network 135 in numerous additional ways. Access Point 190 may include ports, such as 132 and 138. Merely by way of example, ports 132 and 138 may connect to Home Network 135 and/or data collecting device 140, respectively. It may do so using any number of Home Networking technologies such as, merely by way of example, Ethernet over CAT5 cabling, MoCA over Coax, HPNA over twisted-pair, PLC over AC wiring, and/or G.hn (currently being standardized in the ITU). In some embodiments, ports of access point 190 may be configured to interface with different types of communication channel specifications. Merely by way of example, access point 190 and/or its ports, such as 138, may be configured to interface with RS 485, EIA-485, RS 422, and/or encoder-receiver-transmitter ("ERT"), which may be used with different data collecting devices and interface components coupled with data collecting device 140 in order to transmit data to a receiver.

In some embodiments, data collecting device 140 may interface with Power Line Communications ("PLC") network 160 to either provide access to the Internet 150 to devices connected to PLC network 160 and/or to query and/or send commands to intelligent appliances at a customer premises enabling them to be remotely monitored, controlled, and/or maintained by server(s) 155 in the network. PLC network 160 may also be bridged 175 to Home Network 135 effectively expanding Home Network 135 to include data capabilities over AC power lines 170. In some embodiments, components of system 100 may fall on different sides of customer premises boundary 180.

Figure 2:
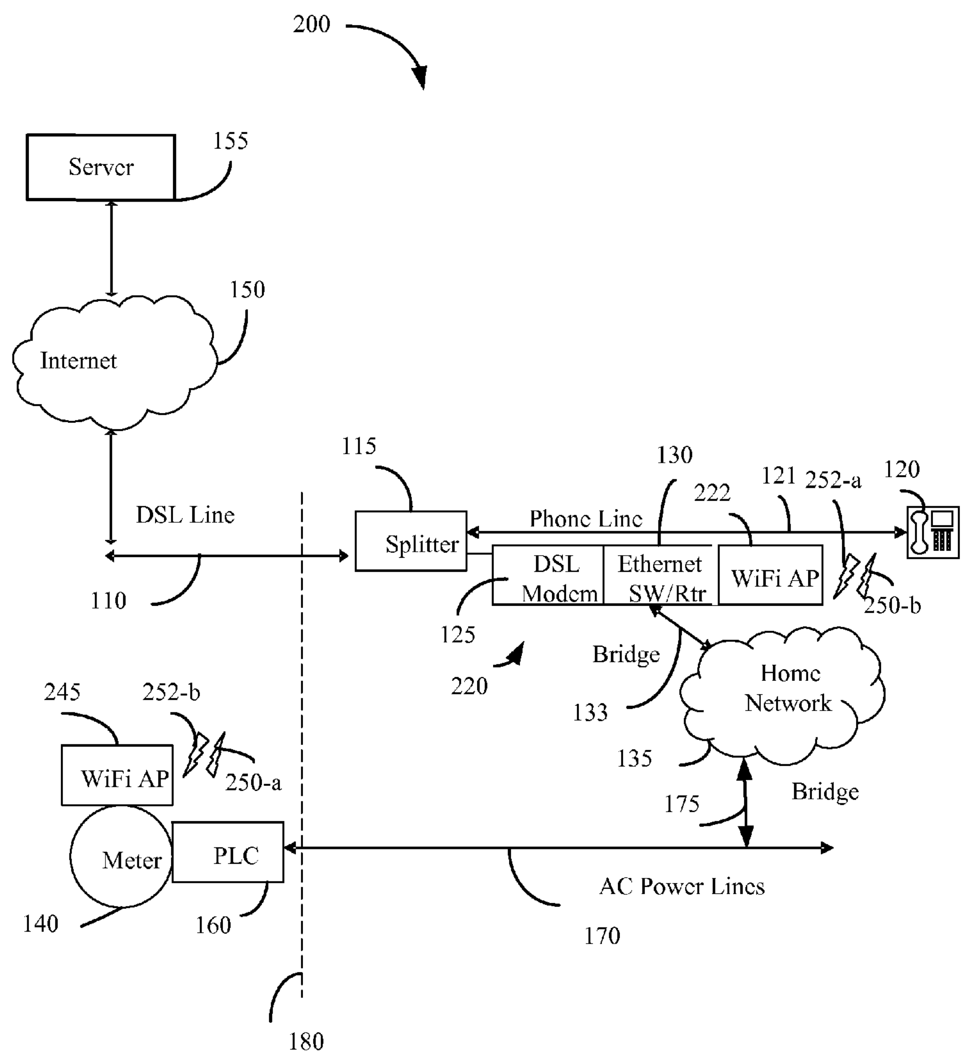
FIG. 2 illustrates a system for transmitting utility usage data using a service provider's access network with a modem interior to a demarcation boundary, in accordance with various embodiments.

FIG. 2 shows another embodiment of system 200 for transmitting utility usage data and/or receiving utility control, monitoring, and maintenance data using a service provider's access network. System 200 may be used in situations where DSL modem 125 may be integrated with a wireless access point, such as WiFi access point ("WiFi AP") 222 or other wireless technology, forming an overall integrated access device ("IAD") 220. IAD 220 may also include Ethernet switch/router 130. In some embodiments, DSL modem 125, WiFi AP 222, and/or switch/router 130 may be in communication with each other, but not integrated. In some embodiments, WiFi AP 222 may be separately housed from DSL Modem 125. Access device 220 may be located inside a customer premises. A wireless client, such as WiFi client 245 at data collection device 140, may associate with access device 222 and or WiFi AP 222 and transport data communication to DSL line 110 through access device 222.

In some embodiments, WiFi client 245 may be able to associate with another WiFi AP besides WiFi AP 222. In some cases, WiFi client 245 may be able to associate with numerous other WiFi APs within range of WiFi client 245. WiFi client 245 may be authorized to associate with these other WiFi APs. Consequently, if WiFi AP 222 may be turned off or is not otherwise functioning, WiFi client 245 at data collection device 140 may associate with another WiFi AP to communicate with server(s) 155. Embodiments such as this may create a redundant mesh.

Data collected by the data collecting device 140 and transmitted 250-*a*/250-*b* from WiFi client 245 may be encrypted. In some embodiments, data collecting device 140 may encrypt the data. WiFi devices such as 245 and/or 222 may also encrypt data to ensure security. In some embodiments, the ability to partition a bandwidth to utilize excess capacity may be used so that a service level agreement ("SLA") is not compromised when server(s) 155 are communicating with data collecting device 140 or other Smart Home devices.

Wireless devices and/or components such as 222 and 245 may also employ a store-and-forward capability so that if DSL modem 125 and associated devices are turned off, or there is a power failure, the exchange of data can resume when the power is restored. Wireless devices such as 222 and 245 may also communicate bi-directionally. Merely by way of example, and more thoroughly discussed above and below, WiFi AP 222 may transmit control data 252, such as 252-*a* and 252-*b*, received from server(s) 155 to WiFi client 245, where control data may be used to control, monitor, and/or maintain devices in communication with meter 140 through PLC 160, AC power lines 170, and/or Home Network 135.

One skilled in the art will recognize that the wireless communication devices disclosed, such as WiFi AP 222 and WiFi client 245 may employ different wireless transmission technologies and protocols. Merely by way of example, but not limited to, wireless devices in the disclosed systems as seen in FIG. 2, FIG. 3, FIG. 6, FIG. 7, and FIG. 8 may include infra-red transmissions, radio frequency ("RF") transmissions (including encoder-receiver-transmitter ("ERT")), and transmissions complying with standards developed by any of the IEEE's working groups governing wireless communication (e.g., the 802.11, 802.15, 802.16, and 802.20 working groups).

Figure 3:
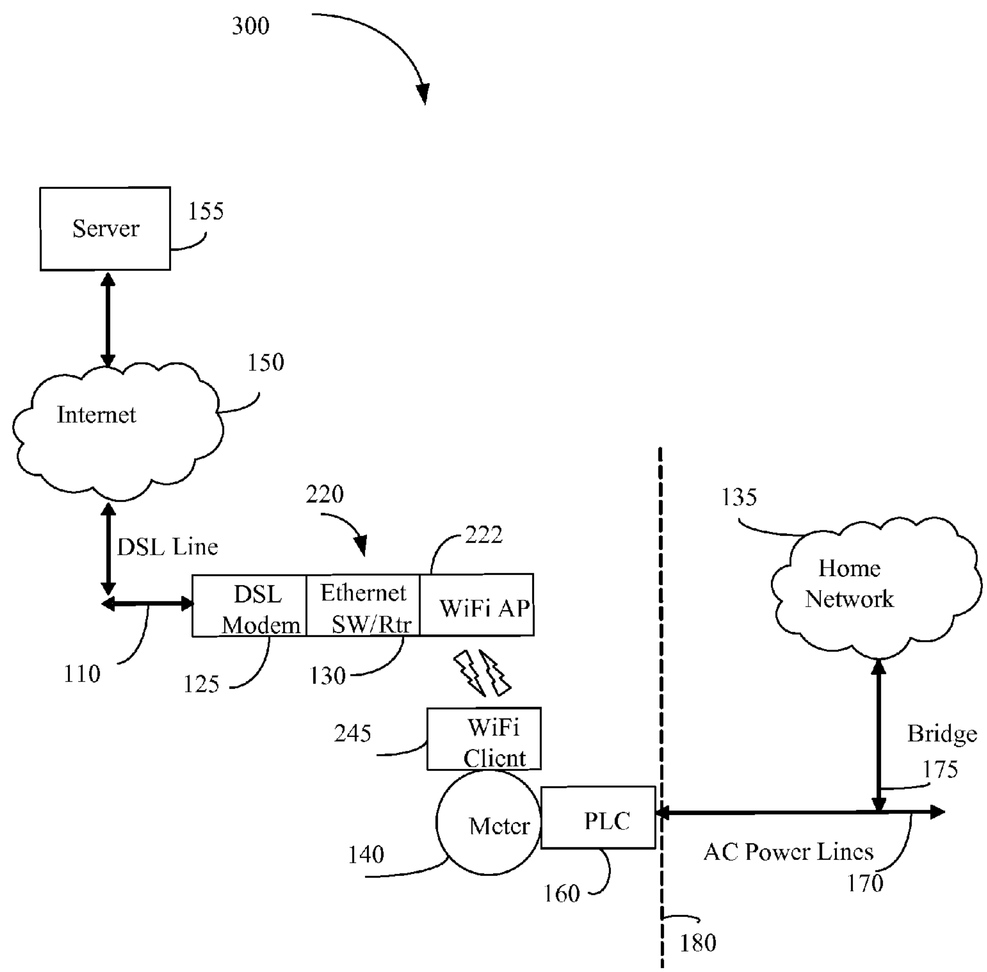
FIG. 3 illustrates a system for transmitting utility usage data using a service provider's access network with a wireless access point exterior to a demarcation boundary, in accordance with various embodiments.

FIG. 3 presents another embodiment of a system 300 for transmitting utility usage data and/or receiving utility control, monitoring, and maintenance data using a service provider's access network. This embodiment illustrates that access point 220 and associated devices 125, 130, and/or 222 may be located outside of customer premises 180 and may be used to communicate with data collecting device 140 through WiFi client 245 and other devices connected to PLC 160. This configuration may be used in cases where the resident of the premises may not be a subscriber to a service provider's access network. It may also be used to fill in coverage gaps. In other cases, an existing device (such as an access provider's NID for providing phone, television and/or data service to the premises) might be pre-installed on the exterior of the premises, and a NID can be modified to serve as an access point 220. In some embodiments, identification information may be associated with each data collection device 140 so that the Network can determine which meters they have successfully communicated with, which devices have failed, etc. so that alternative measures can be taken if necessary.

Figure 4:
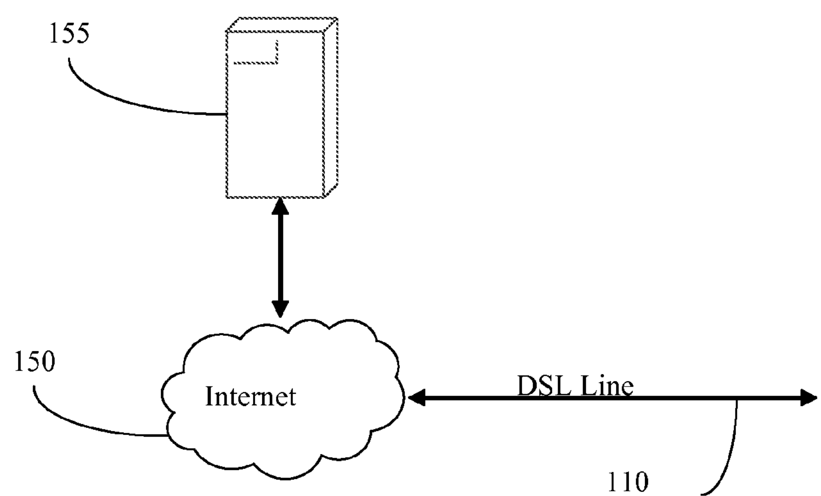
FIG. 4 illustrates aspects of a system for transmitting utility usage data using a service provider's access network, in accordance with various embodiments.

FIG. 4 shows aspects of embodiments of systems for transmitting utility usage data and/or receiving utility control, monitoring, and maintenance data using a service provider's access network. Server 155 may perform processing and management functions needed for the service. Different services can be enabled by different servers 155. Servers 155 may contain or have access to databases that contain authentication, profile, or other appropriate data necessary for the particular service. Servers 155 may be owned and maintained by a utility provider or by a provider of an access network, or by other service/content providers. Server 155 may connect through Internet 150 to DSL line 110 to communicate with systems such as 100, 200, and 300, including data collecting device(s) 140 and PLC(s) 160.

Figure 5:
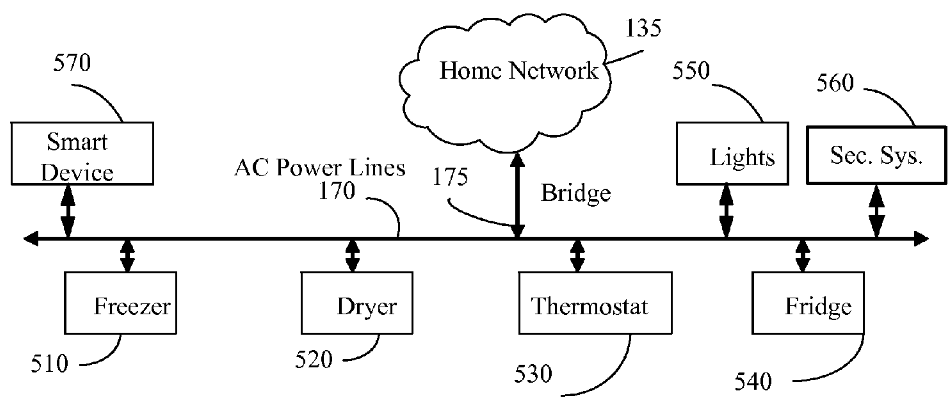
FIG. 5 illustrates aspects of a system for transmitting utility usage data using a service provider's access network, in accordance with various embodiments.

FIG. 5 shows aspects of embodiments of systems for transmitting utility usage data and/or receiving utility control, monitoring, and maintenance data using a service provider's access network. This configuration of an embodiment illustrates that a system may interface with a variety of devices connected to the AC power lines 170 at a customer premises. These devices may be Smart Appliances, PCs, Entertainment Devices, and/or the like. In essence, any device that consumes a utility (such as electricity, gas, etc. and has capabilities of modifying and/or reporting such usage may be accommodated and/or implemented by various embodiments. Merely by way of example, these devices may include, but are not limited to, freezer 510, dryer 520, thermostat 530, refrigerator 540, lights 550, security system 560, and/or smart device(s) 570 in general. Such devices may also be (but need not necessarily be) connected to Home Network 135 through bridge 175. These devices may also be controlled via Home Network 135. Control of devices can be a service provided by a utility provider, a service provider, or even by the user themselves (e.g., via a communication-enabled device which could be a PC, PDA, Cell Phone, or other similar device, such communications may be implemented via the Home Network 135, the Internet, etc.). Home Network 135 may include, but are not limited to, technologies such as PLC, WiFi, MoCA, Ethernet, Zigbee, Z-wave, Bluetooth, G.hn. Procedures for controlling devices may include monitoring devices and maintaining devices, along with turning devices on and off, or otherwise regulating operation and/or utility usage of such devices.

Figure 6:
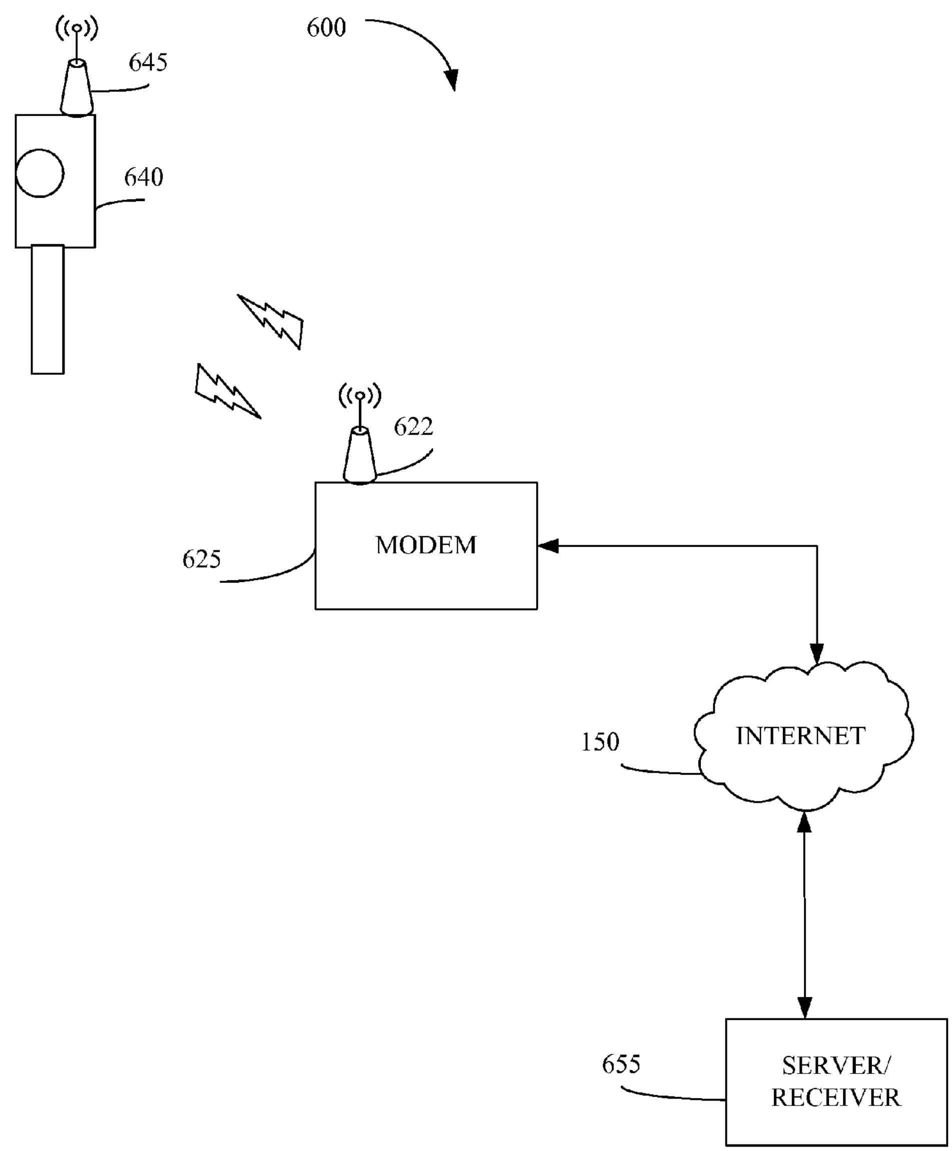
FIG. 6 illustrates a system for transmitting utility usage data using a service provider's access network using a modem configured with a wireless device, in accordance with various embodiments.

FIG. 6 shows another embodiment of a system 600 for transmitting utility usage data and/or receiving utility control, monitoring, and maintenance data using a service provider's access network. Utility box 640 (for example, data collecting device 140) may collect data regarding utility usage. Wireless device and/or component 645 (for example, WiFi client 245) in communication with utility box 640 may transmit utility usage data to broadband modem 625 (for example, DSL modem 125) through wireless access point 622 (for example, WiFi AP 222) in communication with modem 625. Wireless communication between utility box 640 and modem 625 may employ any of the numerous wireless and/or wired communication technologies discussed above. From broadband modem 625, utility usage data may be securely transmitted through Internet or private net, using encryption or other security protocols and/methods such as SSL, VPN, and/or HTTPS, merely by way of example. In some embodiments, broadband modem 625 may utilize a service provider's access network to transmit utility usage data to an Internet point of presence. Utility usage data may be transmitted to server 655 (for example, server(s) 155). Server 655 may be a utility collection server. In some embodiments, transmission may be bi-directional, such that data may be transmitted from utility meter 640 to server 655, and data and/or instructions may be transmitted from server 655 to utility meter 640. These transmissions may be used to control, monitor, or maintain devices associated and/or in further communication with utility meter 640. For example, utility meter 640 may be in communication with a power line communications network (for example, PLC 160).

Figure 7:
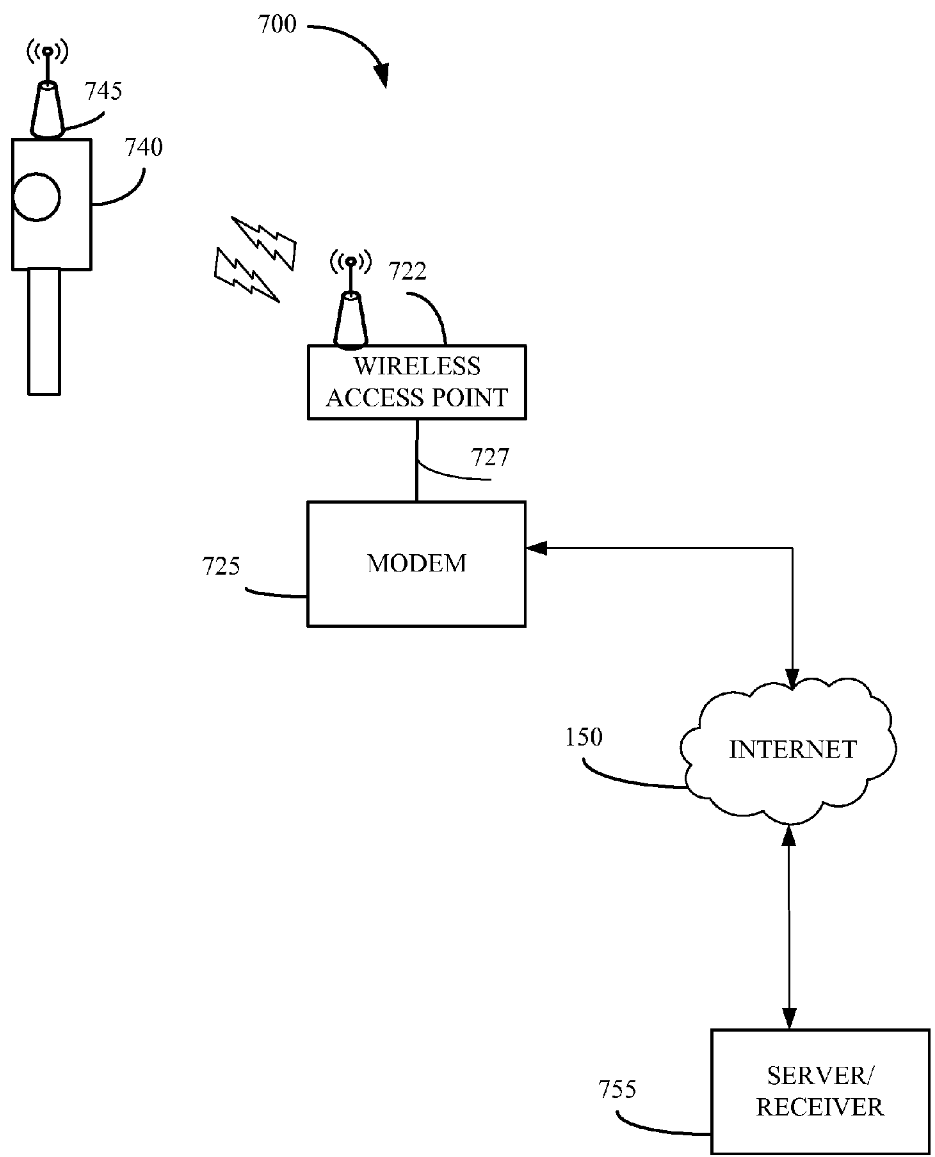
FIG. 7 illustrates a system for transmitting utility usage data using a service provider's access network using a wireless access point in communication with a modem, in accordance with various embodiments.

FIG. 7 shows another embodiment of a system 700 for transmitting utility usage data and/or receiving utility control, monitoring, and maintenance data using a service provider's access network. Utility meter 740 (for example, data collecting device 140) may collect data regarding utility usage. Wireless device or component 745 (for example, WiFi client 245) in communication with utility meter 740 may transmit utility usage data to broadband modem 725 through wireless access point 722 (for example, WiFi AP 222) in communication with modem 725. In this embodiment, wireless access point 722 and modem 725 may be housed separately, yet are in communication with each other. Merely by way of example, connector 727 may connect wireless access point 722 with modem 725, wherein connector 727 may include a USB and/or other Ethernet connections. Wireless communication between utility meter 740 and wireless access point 722 may communicate using the numerous wireless communication technologies disclosed above. From broadband modem 725, utility usage data may be securely transmitted through Internet or private net, using encryption or other security protocols and/methods such as SSL, VPN, and/or HTTPS, merely by way of example. In some embodiments, broadband modem 725 may utilize a service provider's access network to transmit utility usage data to an Internet point of presence. Utility usage data may be transmitted to server 755 (for example, server(s) 155). Server 755 may be a utility collection server. In some embodiments, transmission may be bi-directional, such that may be transmitted from utility meter 740 to server 755, and data and/or instructions may be transmitted from server 755 to utility meter 740. These transmissions may be used to control, monitor, or maintain devices associated and/or in further communication with utility meter 740. For example, utility meter 740 may be in communication with a power line communications network (for example, PLC 160).

Figure 8:
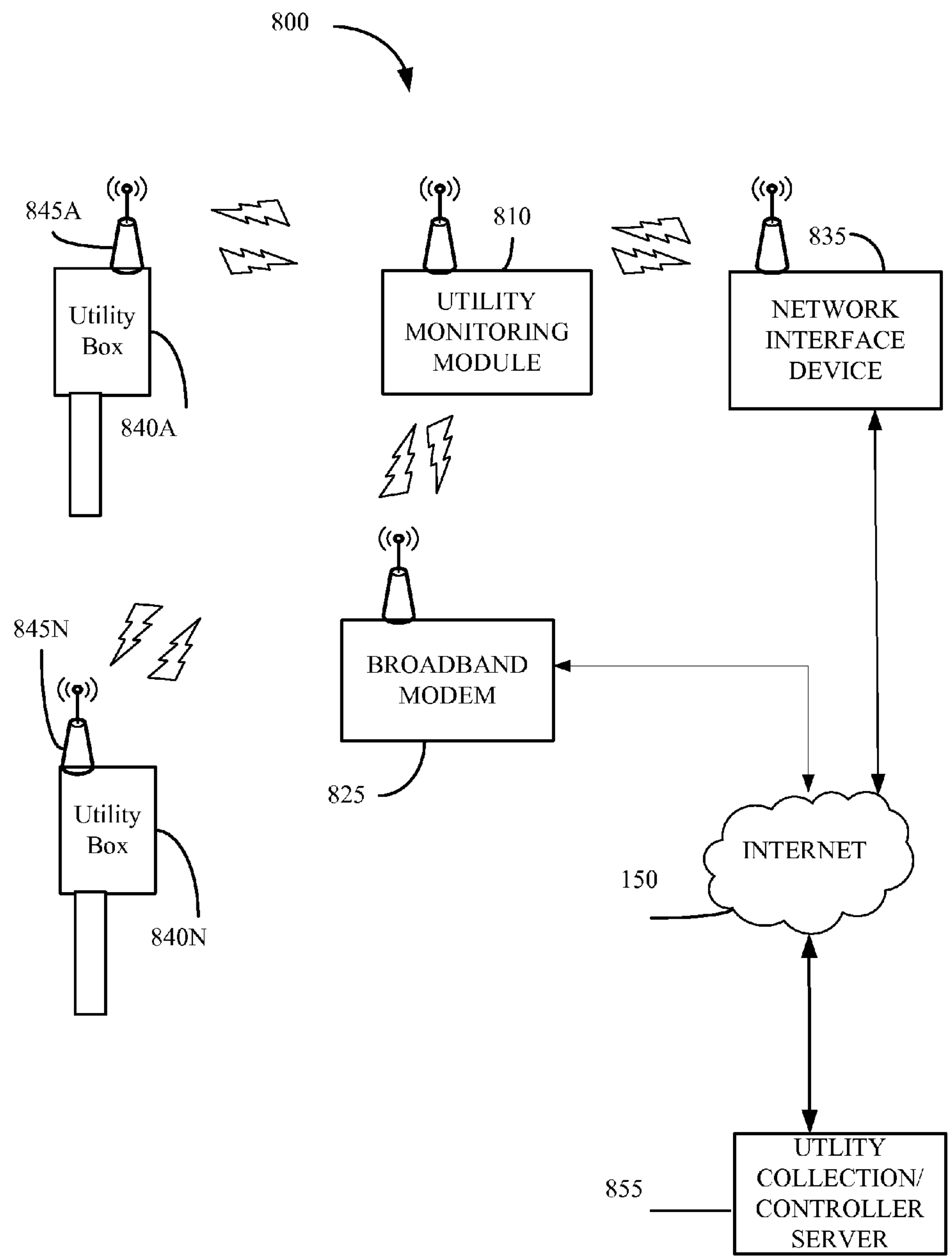
FIG. 8 illustrates a system for transmitting utility usage data using a service provider's access network using utility monitoring modules, network interface devices, and or broadband modems, in accordance with various embodiments.

FIG. 8 shows another embodiment of a system 800 for transmitting utility usage data and/or receiving utility control, monitoring, and maintenance data using a service provider's access network. System 800 includes utility monitoring module ("UMM") 810. UMM 810 may be used to monitor utility usage for a single customer premises or multiple premises. UMM 810 may receive utility usage data from utility box(es) 840A-N (for example, data collecting device 140). Utility boxes 840A-N may be in communication with wireless modules 845A-N (for example, WiFi client 245), respectively, in order to transmit utility usage data to a receiver, such as a receiver used by a utility company that gathers data by sending a technician through a neighborhood to gather utility meter readings. In one embodiment, UMM 810 receives utility usage data from utility boxes 840A-N and may then transmit it to another device capable of connecting to a network, such as Internet 150. UMM 810 may transmit utility usage data to broadband modem 825 (for example, modem 125), which may then transmit modulated utility usage data to server 855 (for example, server(s) 155) via Internet 150. In some embodiments, UMM 81 may transmit utility usage data to network interface device ("NID") 835, which may also transmit utility usage data to server 855 via Internet 150.

UMM 810 may be coupled with utility box 840 in some embodiments. In other embodiments, UMM 810 may be coupled with broadband modem 825 or NID 835 via an Ethernet/USB cable. In still other embodiments, UMM 810 may be built into modem 825 or NID 835.

In some embodiments, UMM 810 may be provided for each utility and/or service provider. Thus, there may be multiple UMMs associated with a customer premises. In other embodiments, UMM 810 may be a central UMM, capable of aggregating utility usage data from multiple types of utility use associated possible with different utility providers.

In some embodiments, UMM 810 may do more than receive data from utility boxes like 840. UMM 810 may be capable of transmitting data and/or instructions to utility box 840. UMM 810 may, for example, transmit control data received from utility collection/controller server 855, through either broadband modem 825 or NID 835, to utility box 840. Control data may be used to control, monitor, or maintain devices in communication with utility box 840. In some embodiments, this may be achieved through a power line communications network in communication with utility box 840.

As similarly discussed with other embodiments, UMM 810 may also facilitate how frequently utility usage data is transmitted through the system. Data may be transmitted automatically without human input. Data may be transmitted on a regular schedule, such as every second, every minute, every hour, every day, and/or every month, or based on specific numerical increments of these time units. Data may be transmitted in real-time. Data may be transmitted based on other factors, such as when the utility usage changes, such as when the utility usage goes up or goes down and/or when a specific device is used. Data may be transmitted when queried by another device, server, entity, and/or user. Data may be transmitted when the cost of utility usage changes. Merely by way of example, if the cost of electricity, gas, and/or water changes, the rate or timing of data transmission may change, which may allow a utility provider to charge more accurately a customer based on when and how to use a utility. Also, the rate or timing of data transmission may also be determined to help provide a user of the utility, such as a utility customer, more information so that they may be better able to monitor and control their utility usage. Data may also be transmitted when the data collecting device receives a prompt sent by a receiving entity.

As similarly discussed with other embodiments, UMM 810 may transmit utility usage data securely using methods disclosed above, for example.

Figure 9:
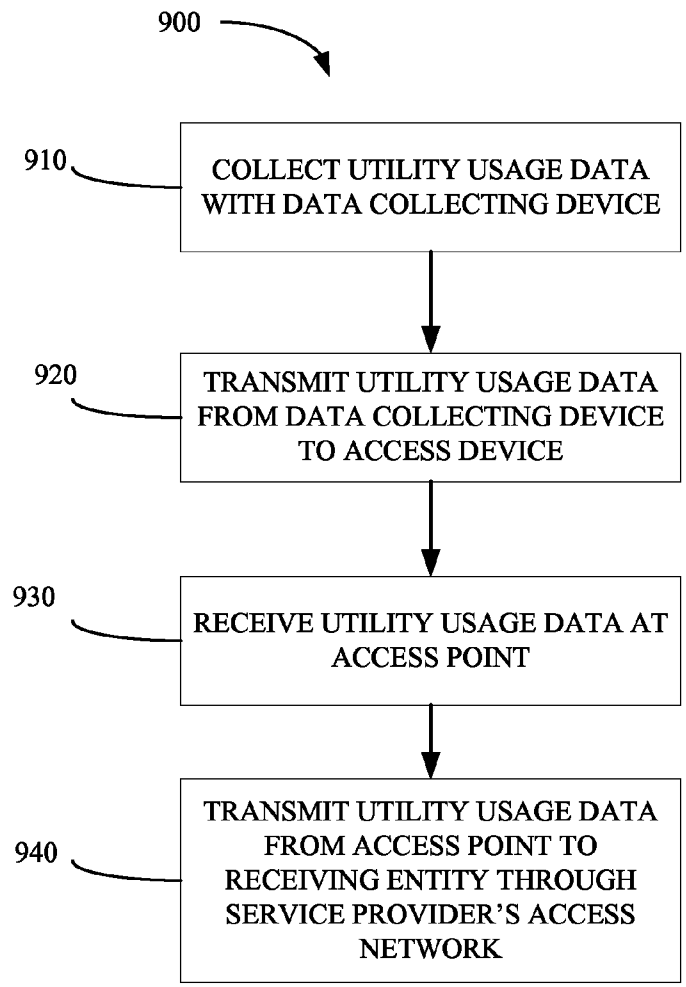
FIG. 9 illustrates a block diagram for methods of transmitting utility usage data to a receiving entity using a service provider's access network, in accordance with various embodiments.

FIG. 9 illustrates a method 900 of transmitting utility usage data. Method 900 may be employed on systems such as system 100, 200, 300, 400, 500, 600, 700, and/or 800. Method 900 may utilize the different aspects of these systems. Merely by way of example, in an aspect, method 900 may use a service provider's access network. In one embodiment, method 900 may include collecting utility usage data with a data collecting device (block 910). In some cases, the data collecting device may be a utility meter. The utility usage data may pertain to a customer premises.

A data collecting device in method 900 may include a wide variety of devices, including without limitation the data collecting devices described above, and may operate in similar fashion to the data collecting devices described above. Merely by way of example, a utility meter may collect data regarding customer premises equipment ("CPE"). A utility meter may collect data regarding smart devices, such as those described above.

A data collecting device in method 900 may be in communication with a power line communications ("PLC") network, examples of which are described above.

Utility usage data of method 900 may include a wide variety of data, for example as described above.

In some embodiments, method 900 may further include transmitting utility usage data from the data collecting device to an access point coupled with a modem (block 920), for example using the techniques described above.

Method 900 may include receiving the utility usage data at the access point (including without limitation any of the access points described above) from a data collecting device (block 930).

Method 900 may include transmitting the utility usage data from the access point to a receiving entity (described above) through the service provider's access network (block 940). Utility usage data may be transmitted from an access point to a receiving entity in a variety of different ways, including without limitation transmission through a service provider's access network. Utility usage data may be transmitted through a public switched telephone network. Utility usage data may be received at an Internet point of presence and the reach a receiving entity via the Internet.

As noted above, data may be transmitted securely from a data collecting device to an access point and/or from an access point to a receiving entity. Merely by way of example, in some embodiments, the utility usage data may be encrypted. In some embodiments, utility usage data may be securely transmitted using methods, networks, and/or protocols such as SSL, VPN, HTTPS and/or other known methods for securely transmitting data over different communications channels. In some embodiments, utility usage data from a data collection device may include identification information that distinguishes it from other utility usage data from other data collection devices. This may allow different access points and/or receiving entities to know if different data collecting devices have been successfully communicated with, which data collecting data devices have not been communicated with, providing for alternative measures to be taken if necessary.

Figure 10:
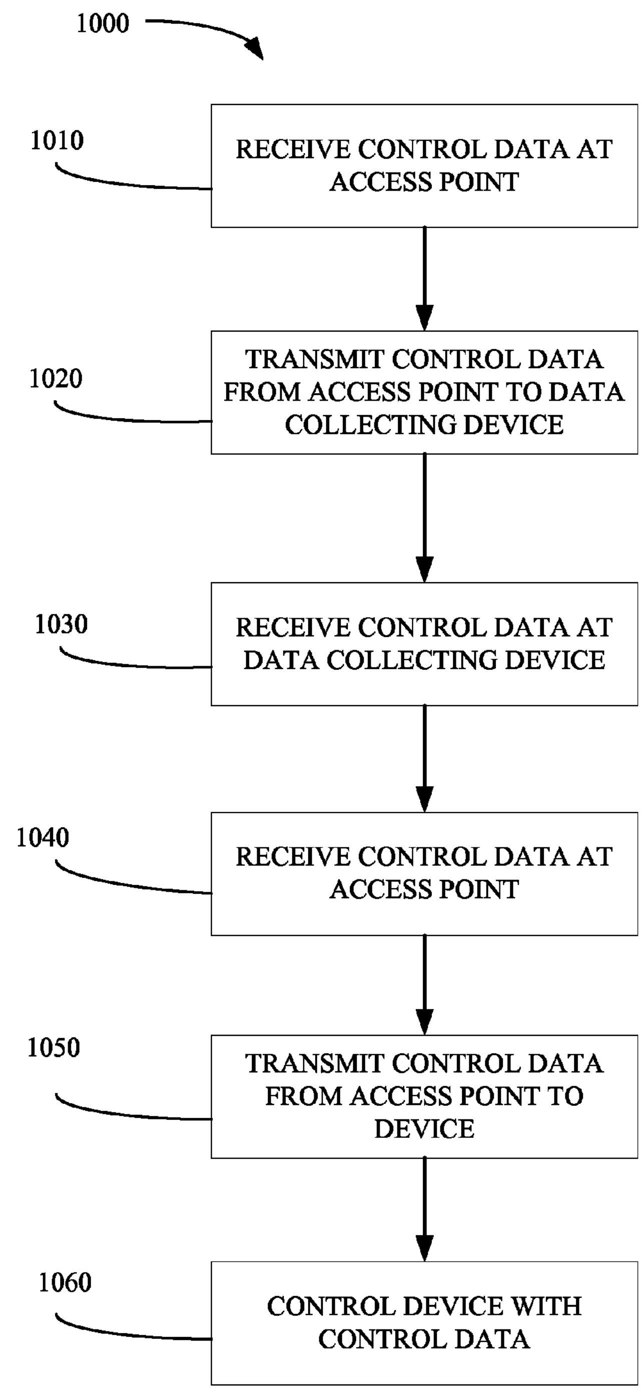
FIG. 10 illustrates a block diagram for methods of transmitting control data from a receiving entity to a customer premises using a service provider's access network, in accordance with various embodiments.

FIG. 10 illustrates a method 1000 of transmitting utility usage data utilizing the other systems and methods disclosed above that also include control data. Method 1000 may be employed on systems such as those disclosed above. In some embodiments, method 1000 may include bi-directional communication. Utility usage data, for example, may be transmitted to a receiving entity as disclosed above, for example, with respect to method 900. Data may also be transmitted from a receiving entity or other entity to a data collecting device. A data collecting device in communication with a PLC may send this received data to a device, appliance, or equipment also in communication with the PLC in order to control, monitor, and/or maintain the device, appliance, or equipment.

In one embodiment, method 1000 may include receiving a set of control data at an access point (block 1010). Method 1000 comprises transmitting the control data from the access point to a data collecting device (block 1020). Method 1000 may include receiving the control data at the data collecting device (block 1030). The control data may be transmitted from the access point to a data collecting device. Method 1000 may include transmitting the control data from the data collecting device to at least one device (block 1040). Method 1000 may include controlling the at least one device with the control data (block 1050). The control data may be received at the data collecting device and then transmitted to multiple devices order to control, monitor, and/or maintain the device (block 1060). In some embodiments, the control data received at the data collecting device may prompt the data collecting device to transmit utility usage data to a receiving entity. Merely by way of example, a data collecting device may need to be "woken up" before it will transmit data. Thus, in some embodiments, a receiving entity may transmit to a data collecting device a "wake up" signal, prompting the data collecting device to send data to the receiving entity, for example. The systems and methods disclosed throughout this application provide further aspects that may be employed within embodiments of method 1000.

While detailed descriptions of one or more embodiments have been give above, various alternatives, modifications, and equivalents will be apparent to those skilled in the art without varying from the spirit of the invention. Moreover, except where clearly inappropriate or otherwise expressly noted, it should be assumed that the features, devices, and/or components of different embodiments may be substituted and/or combined. Thus, the above description should not be taken as limiting the scope of the invention, which is defined by the appended claims.

What is claimed is:

1. A method for transmitting utility usage data using a public switched telephone network, the method comprising:

collecting, with a utility meter at a customer premises, utility usage data pertaining to the customer premises;

transmitting automatically the utility usage data from the utility meter to an access point of the public broadband network;

receiving the utility usage data at the access point;

modulating the utility usage data at the access point with a digital subscriber line modem coupled with the access point; and transmitting securely the utility usage data through the public switched telephone network to an Internet point of presence, using a secure communications protocol selected from the group consisting of secure sockets layer, virtual private network, and hypertext transfer protocol secure;

receiving the utility usage data at the Internet point of presence;

transmitting the utility usage data from the Internet point of presence to a utility provider via the Internet;

receiving, at the access point, a set of control data;

transmitting the control data from the access point to the utility meter;

receiving the control data at the utility meter;

transmitting the control data from the utility meter to a security system at the customer premises; and controlling the security system with the control data to arm and disarm the security system.

2. A method for transmitting utility usage data using a service provider's access network, comprising:

collecting the utility usage data with a data collecting device;

transmitting securely the utility usage data from the data collecting device to an access point coupled with a modem, using a secure communications protocol selected from the group consisting of secure sockets layer, virtual private network, and hypertext transfer protocol secure;

receiving the utility usage data at the access point;

transmitting the utility usage data from the access point to a receiving entity through the service provider's access network;

receiving, at the access point, a set of control data;

transmitting the control data from the access point to the data collecting device;

receiving the control data at the data collecting device;

transmitting the control data from the data collecting device to a security system; and controlling the security system with the control data to arm and disarm the security system.

3. The method of claim 2, wherein the data collecting device is in communication with a power line communications network.

4. The method of claim 2, wherein the data collecting device comprises a device selected from the group consisting of:

an electricity meter;

a gas meter;

a water meter;

a set-top box; and a network interface device.

5. The method of claim 2, wherein the data collecting device is attached to an exterior wall of a customer premises.

6. The method of claim 2, wherein the utility usage data comprises utility usage data from a smart device.

7. The method of claim 2, wherein transmitting the utility usage data from the data collecting device comprises transmitting the utility usage data from the data collection device automatically without human input.

8. The method of claim 2, wherein transmitting the utility usage data from the data collecting device comprises transmitting the utility usage data in real-time.

9. The method of claim 2, wherein transmitting the utility usage data from the data collecting device to the access point comprises transmitting the utility usage data wirelessly.

10. The method of claim 2, wherein transmitting the utility usage data from the data collecting device to the access point occurs when the data collecting device receives a prompt from the receiving entity.

11. The method of claim 2, wherein the access point is located within a customer premises.

12. The method of claim 2, wherein the access point is located outside a customer premises.

13. The method of claim 2, where the modem is a digital subscriber line modem.

14. The method of claim 2, where the modem is an optical network termination device.

15. The method of claim 2, wherein the access point is a network interface device.

16. The method of claim 2, further comprising providing power to the access point through a connector coupled with the data collecting device.

17. The method of claim 2, wherein transmitting the utility usage data comprises transmitting the utility usage data securely.

18. The method of claim 2, wherein the receiving entity comprises an entity selected from the group consisting of:

a utility provider;

a service provider;

a utility services provider;

an aggregation provider; and a customer.

19. The method of claim 2, wherein the access point is configured to receive the utility usage data through a communication channel, wherein the communication channel comprises a channel selected from the group consisting of:

an RS485 channel;

an RS232 channel;

an EIA-485 channel; and an encoder-receiver-transmitter ("ERT") channel.

20. The method of claim 2, wherein the control data is received from the receiving entity.

21. The method of claim 20, wherein the receiving entity comprises an entity selected from the group consisting of:

a utility provider;

a service provider;

a utility services provider;

an aggregation provider; and a customer.

22. A system for transmitting utility usage data using a public switched telephone network, comprising:

a power line communications network at a customer premises;

a utility meter in communication with the power line communications network, wherein the utility meter collects utility usage data from a customer premises;

a transmission device in communication with the utility meter, wherein the transmission device is configured to transmit automatically and securely the utility usage data from the utility meter, using a secure communications protocol selected from the group consisting of secure sockets layer, virtual private network, and hypertext transfer protocol secure;

an access device, wherein the access device is in communication with the transmission device to receive the secure utility usage data;

a digital subscriber line modem in communication with the access device, wherein the digital subscriber line modem is configured to securely transmit the utility usage data through the public switched telephone network to a utility provider via the Internet, wherein the access device is further configured to receive a set of control data and to transmit the control data to the utility meter; and wherein the utility meter is further configured to receive the control data, to transmit the control data, via the powerline communications network, to a security system at the customer premises, and to control the security system with the control data to arm and disarm the security system.

23. A system for transmitting utility usage data over a service provider's access network, comprising:

a utility usage data collecting device;

a broadband modem in communication with the data collecting device, wherein the broadband modem is configured to communicate with the service provider's access network and to securely transmit data from the data collecting device to a receiving entity, using a secure communications protocol selected from the group consisting of secure sockets layer, virtual private network, and hypertext transfer protocol secure;

wherein the utility usage data collecting device is configured to receive a set of control data, to transmit the control data to a security system, and to control the security system with the control data to arm and disarm the security system.

24. The system of claim 23, further comprising a power line communications network in communication with the data collecting device.

25. The system of claim 23, further comprising a network interface device housing the broadband modem.

26. The system of claim 23, wherein the broadband modem is a digital subscriber line modem.

27. The method of claim 23, where the modem is an optical network termination device.

28. The system of claim 24, wherein:

the broadband modem is further configured to receive control instructions from the receiving entity and to transmit the control instructions to the power line communications network; and the power line communications network is further configured to transmit the control instructions to at least one device in order to control the at least one device.

29. The system of claim 23, further comprising a utility monitoring module in communication with the broadband modem and the utility usage device.

* * * * *